(12) United States Patent
Suyama et al.

(10) Patent No.: US 10,270,143 B2
(45) Date of Patent: Apr. 23, 2019

(54) ELECTROLYTE FOR METAL-AIR BATTERIES AND METAL-AIR BATTERY

(71) Applicant: Toyota Jidosha Kabushiki Kaisha, Toyota-shi, Aichi-ken (JP)

(72) Inventors: Hiroshi Suyama, Mishima (JP); Tomohiro Kuroki, Susono (JP); Kazushi Wakayama, Susono (JP); Gen Ikeda, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 105 days.

(21) Appl. No.: 15/258,465

(22) Filed: Sep. 7, 2016

(65) Prior Publication Data

US 2017/0077524 A1   Mar. 16, 2017

(30) Foreign Application Priority Data

Sep. 10, 2015  (JP) .................................. 2015-178874

(51) Int. Cl.
   *H01M 6/04*    (2006.01)
   *H01M 12/06*   (2006.01)
   *H01M 2/02*    (2006.01)

(52) U.S. Cl.
   CPC .... *H01M 12/06* (2013.01); *H01M 2300/0014* (2013.01)

(58) Field of Classification Search
   CPC .... H01M 6/045; H01M 12/06; H01M 2/0257; H01M 2300/0002; H01M 2300/0014
   See application file for complete search history.

(56) References Cited

U.S. PATENT DOCUMENTS

| 2,800,520 | A | 7/1957 | McGraw |
| 3,682,707 | A | 8/1972 | Sandler |
| 4,273,841 | A | 6/1981 | Carlson |
| 4,333,993 | A | 6/1982 | Gibbard |

(Continued)

FOREIGN PATENT DOCUMENTS

| JP | 2012015025 A | 1/2012 |
| JP | 2014-139878 A | 7/2014 |
| JP | 2015090860 A | 5/2015 |

OTHER PUBLICATIONS

U.S. Appl. No. 15/195,372, filed Jun. 28, 2016 (Inventor: Hiroshi Suyama).

(Continued)

*Primary Examiner* — Muhammad S Siddiquee
(74) *Attorney, Agent, or Firm* — Dinsmore & Shohl LLP

(57) ABSTRACT

An electrolyte for metal-air batteries, which is able to inhibit the self-discharge of metal-air batteries, and a metal-air battery using the electrolyte. The electrolyte for metal-air batteries having an anode containing at least one kind of metal element selected from aluminum and magnesium, may comprise an aqueous solution comprising a self-discharge inhibitor containing at least one kind of ion selected from the group consisting of an $H_2P_2O_7^{2-}$ anion and a $Ca^{2+}$ cation and at least one kind of ion selected from the group consisting of a $CH_3S^-$ anion, an $S_2O_3^{2-}$ anion and an $SCN^-$ anion.

5 Claims, 3 Drawing Sheets
(1 of 3 Drawing Sheet(s) Filed in Color)

(56) References Cited

U.S. PATENT DOCUMENTS

| | | | |
|---|---|---|---|
| 5,124,120 A | 6/1992 | Sklarchuck et al. | |
| 5,372,691 A | 12/1994 | Kao et al. | |
| 7,763,385 B2 | 7/2010 | Pozin et al. | |
| 2001/0012586 A1* | 8/2001 | Hong | H01M 4/0445 429/223 |
| 2003/0077512 A1 | 4/2003 | Charkey et al. | |
| 2007/0099050 A1* | 5/2007 | Pozin | H01M 4/244 429/406 |
| 2007/0113875 A1* | 5/2007 | Wang | C01B 15/037 134/42 |
| 2008/0096061 A1 | 4/2008 | Burchardt | |
| 2008/0305389 A1 | 12/2008 | Arora et al. | |
| 2012/0141889 A1 | 6/2012 | Lee et al. | |
| 2012/0293110 A1 | 11/2012 | Frederick et al. | |
| 2012/0328963 A1 | 12/2012 | Yamaguchi et al. | |
| 2015/0010833 A1 | 1/2015 | Amendola et al. | |
| 2015/0357859 A1* | 12/2015 | Pourdarvish | H01M 10/44 320/159 |
| 2016/0204445 A1* | 7/2016 | Jung | H01M 4/9033 429/406 |
| 2016/0240890 A1* | 8/2016 | Park | H01M 10/399 |

OTHER PUBLICATIONS

Office Action dated Mar. 28, 2018 for U.S. Appl. No. 15/195,372.
Office Action dated Nov. 2, 2018 in U.S. Appl. No. 15/195,372, filed Jun. 28, 2016.
Final Office Action dated Jul. 19, 2018 for U.S. Appl. No. 15/195,372.
Notice of Allowance dated Feb. 15, 2019 in U.S. Appl. No. 15/195,372, filed Jun. 28, 2016 (Inventor: Hiroshi Suyama).

* cited by examiner

ELECTROLYTE FOR METAL-AIR BATTERIES AND METAL-AIR BATTERY

CROSS-REFERENCE TO RELATED APPLICATION

This application claims priority to Japanese Patent Application No. 2015-178874 filed on Sep. 10, 2015, the entire contents of which are hereby incorporated by reference into the present application.

TECHNICAL FIELD

The disclosure relates to an electrolyte for metal-air batteries, and a metal-air battery.

BACKGROUND

An air battery in which oxygen is used as an active material, has many advantages such as high energy density. Well-known examples of air batteries include metal-air batteries such as an aluminum-air battery and a magnesium-air battery.

As a technique relating to such air batteries, an aluminum-air battery including a cathode (air electrode), an electrolyte and an anode in which an aluminum metal is used, is disclosed in Patent Literature 1 (Japanese Patent Application Laid-Open No. 2014-139878), for example.

However, metal-air batteries using a metal element such as aluminum or magnesium in the anode, have a problem of self-discharge.

SUMMARY

The disclosed embodiments were achieved in light of the above circumstance. An object of the disclosed embodiments is to provide an electrolyte for metal-air batteries, which is able to inhibit the self-discharge of metal-air batteries, and a metal-air battery using the electrolyte.

In a first embodiment, there is provided an electrolyte for metal-air batteries having an anode containing at least one kind of metal element selected from aluminum and magnesium. The electrolyte comprises an aqueous solution comprising a self-discharge inhibitor containing at least one kind of ion selected from the group consisting of an $H_2P_2O_7^{2-}$ anion and a $Ca^{2+}$ cation and at least one kind of ion selected from the group consisting of a $CH_3S^-$ anion, an $S_2O_3^{2-}$ anion and an $SCN^-$ anion.

The self-discharge inhibitor may comprise at least one selected from the group consisting of $Na_2H_2P_2O_7$ and $Ca(OH)_2$ and at least one selected from the group consisting of $CH_3SNa$, $Na_2S_2O_3$ and $NaSCN$.

A content of the self-discharge inhibitor may be in a range of 0.001 mol/L or more to 0.1 mol/L or less.

The aqueous solution may be basic.

The aqueous solution may further comprise NaOH as an electrolyte compound.

In another embodiment, there is provided a metal-air battery comprising an air electrode configured to receive an oxygen supply, an anode containing at least one kind of metal element selected from aluminum and magnesium, and an electrolyte as set forth above, the electrolyte being in contact with the air electrode and the anode.

According to the disclosed embodiments, the self-discharge of metal-air batteries can be inhibited.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

1. Electrolyte for Metal-Air Batteries

Figure 1:
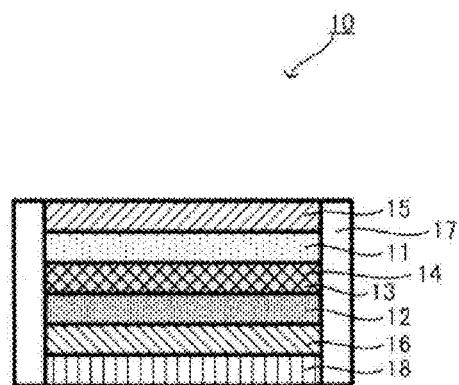
FIG. 1 is a sectional view of a schematic configuration of the metal-air battery according to one or more embodiments disclosed and discussed herein.

The electrolyte for metal-air batteries according to the disclosed embodiments is an electrolyte for metal-air batteries having an anode containing at least one kind of metal element selected from aluminum and magnesium, the electrolyte comprising an aqueous solution comprising a self-discharge inhibitor containing at least one kind of ion selected from the group consisting of an $H_2P_2O_7^{2-}$ anion and a $Ca^{2+}$ cation and at least one kind of ion selected from the group consisting of a $CH_3S^-$ anion, an $S_2O_3^{2-}$ anion and an $SCN^-$ anion.

A metal-air battery having an anode containing at least one kind of metal element selected from aluminum and magnesium causes heavy self-discharge when the anode is brought in contact with the electrolyte; therefore, it has a problem of large battery capacity loss.

The self-discharge reaction of the metal-air battery is caused when a local cell is formed due to a potential difference between the main element (Al, Mg) of the metal contained in the anode (hereinafter it may be referred to as anode metal) and impurity elements (e.g., iron) contained in the metal. For example, if the main element of the metal is aluminum, iron, which is an impurity element, serves as the cathode. In the cathode, a reductive decomposition reaction of water is developed on the iron surface. In the anode, an oxidation reaction of the aluminum (that is, an elution reaction induced by ionization) is developed.

Meanwhile, if a high-purity metal is used as the anode metal, self-discharge is less likely to occur. However, it is problematic in that there is an increase in cost and makes practical application difficult.

It was found that the self-discharge of the metal-air battery can be inhibited by adding, as the self-discharge inhibitor, a compound containing an $H_2P_2O_7^{2-}$ anion, $Ca^{2+}$ cation, $CH_3S^-$ anion, $S_2O_3^{2-}$ anion or $SCN^-$ anion to the electrolyte.

When the self-discharge inhibitor contains a $Ca^{2+}$ cation, it was confirmed by the energy dispersive X-ray (EDX) analysis of the surface of the aluminum anode after discharge, that Ca-based precipitate is present on the surface of iron, which is an impurity of the aluminum anode. Due to this fact, it is considered that calcium ions are more attracted to the surface of the iron, which is an impurity metal contained in the aluminum anode, than to the surface of the aluminum metal, and they receive electrons on the surface of the iron, so that calcium is preferentially deposited on the iron surface. Therefore, it is considered that direct contact of the impurity metal (e.g., iron) with the electrolyte is inhibited. As a result, it is considered that the formation of a local cell is inhibited, so that the self-discharge of the metal-air battery is inhibited.

Even when the magnesium metal is used in the anode, since magnesium is a metal that is, like aluminum, electrochemically baser than iron, it is considered that the calcium ions contained in the self-discharge inhibitor are more attracted to the surface of the iron, which is an impurity contained in the magnesium anode, than to the magnesium metal surface, and they receive electrons on the surface of the iron, so that calcium is preferentially deposited on the iron surface.

When the self-discharge inhibitor contains an $H_2P_2O_7^{2-}$ anion, $CH_3S^-$ anion, $S_2O_3^{2-}$ anion or $SCN^-$ anion, it is considered that the anion preferentially adsorbs onto the surface of the impurity metal (e.g., iron) contained in the anode metal. Therefore, it is considered that direct contact of the impurity metal with the electrolyte is inhibited. As a result, it is considered that the formation of a local cell is inhibited, so that the self-discharge of the metal-air battery is inhibited.

However, in the case of using any one of the self-discharge inhibitors, there is a problem that a sufficient self-discharge inhibiting effect is not obtained only by increasing the amount of the self-discharge inhibitor added.

As a result of considerable research, it was found that a higher self-discharge inhibiting effect can be obtained by combining two or more of the specified self-discharge inhibitors, rather than by using any one of the self-discharge inhibitors. It is considered that the reason for this is due to the additive/synergetic effect of the mechanism estimated above.

Also, it was found that the coarsening of a discharge product produced upon discharge, such as aluminum hydroxide or magnesium hydroxide, can be inhibited when the self-discharge inhibitor contains an $S_2O_3^{2-}$ anion, when the self-discharge inhibitor contains an $SCN^-$ anion and does not contain any $CH_3S^-$ anion, and when the self-discharge inhibitor contains an $H_2P_2O_7^{2-}$ anion and an $SCN^-$ anion.

It is considered that the reason for the coarsening of the discharge product is because the impurity present in the anode metal, such as iron, silicon, zinc, manganese, zirconium, copper, nickel, titanium or chromium, serves as the core of the discharge product deposited on the anode surface. It is also considered that the anion contained in the self-discharge inhibitor added to the electrolyte, forms a complex with the impurity such as iron, so that the coarsening of the discharge product resulting from the impurity can be inhibited. Therefore, according to the electrolyte of the disclosed embodiments, it is considered that the anion contained in the self-discharge inhibitor forms a complex with the impurity such as iron, so that the iron, which is in a solid state, can be quickly eluted into the electrolyte. As a result, it is considered that the formation of a local cell is inhibited, so that the capacity of the metal-air battery can be increased.

When the self-discharge inhibitor contains $SCN^-$ and $CH_3S^-$ anions and does not contain any $H_2P_2O_7^{2-}$ anion, it is estimated that the effect of inhibiting the coarsening of the discharge product is not obtained since the anions have S and are similar in action site.

The aqueous solution contains at least the self-discharge inhibitor and an electrolyte compound.

The self-discharge inhibitor is not particularly limited, as long as it contains at least one kind of ion selected from the group consisting of an $H_2P_2O_7^{2-}$ anion and a $Ca^{2+}$ cation and at least one kind of ion selected from the group consisting of a $CH_3S^-$ anion, an $S_2O_3^{2-}$ anion and an $SCN^-$ anion.

In particular, the aqueous solution may contain at least one compound selected from the group consisting of (1) a compound having a phosphoric acid-based anion and (2) a compound having a calcium ion, and at least one compound selected from the group consisting of (3) a compound having a thiocyanic acid-based or sulfur oxide-based anion and (4) a thiol-based (thiolate-based) compound.

The content of the self-discharge inhibitor in the electrolyte is not particularly limited and may be in a range of 0.001 mol/L or more to 0.1 mol/L or less. When the content is less than 0.001 mol/L, it may be difficult to obtain the self-discharge inhibiting effect. When the content is more than 0.1 mol/L, the self-discharge inhibitor may not be dissolved in the electrolyte and may disrupt the discharge reaction of the battery.

(1) Compound Having a Phosphoric Acid-Based Anion

An anion is contained in the compound having a phosphoric acid-based anion. The compound may contain at least an $H_2P_2O_7^{2-}$ anion, and it may also contain anions such as $PO_2^{3-}$, $PO_4^{3-}$ and $P_2O_7^{4-}$.

A cation is contained in the compound having a phosphoric acid-based anion. It may be a cation of at least one kind of metal selected from the group consisting of Li, K, Na, Rb, Cs, Fr, Mg, Ca, Sr, Ba and Ra. Also, the cation may be $K^+$ or $Na^+$, or it may be $Na^+$.

The compound having a phosphoric acid-based anion may also contain at least one $H^+$, in addition to the cation(s) of the above-mentioned metal(s).

Examples of the compound having a phosphoric acid-based anion include $Na_2HPO_4$, $Na_3PO_4$, $Na_4P_2O_7$, $NaH_2PO_2$, $Na_2H_2P_2O_7$, $MgHPO_4$, $NaMgPO_4$, $Mg_2P_2O_7$, $MgHPO_2$, $NaMgPO_2$, $MgH_2P_2O_7$, $NaMgHP_2O_7$, $Na_2MgP_2O_7$, $KH_2PO_2$, $LiH_2PO_2$, $K_3PO_4$, $Li_3PO_4$, $K_2HPO_4$, $Li_2HPO_4$, $K_4P_2O_7$, $Li_4P_2O_7$, $K_2H_2P_2O_7$, $Li_2H_2P_2O_7$, $CaHPO_4$ and $Ca_2P_2O_7$. Of them, the compound may be $Na_2H_2P_2O_7$.

(2) Compound Having a Calcium Ion

An anion is contained in the compound having a calcium ion. Examples of the anion include $OH^-$, $BH_4^-$, $Br^-$, $I^-$, $CO_3^{2-}$, $NCN^{2-}$, $FPO_3^{2-}$, $HPO_4^{2-}$, $PO_4^{3-}$, $P_2O_7^{2-}$, $NO_3^-$, $NO_2^-$, $ClO_4^-$, $IO_3^-$, $OCl^-$, $H_2PO_4^-$, $SO_4^{2-}$, $S^{2-}$ and $SCN^-$. Of them, the anion may be $OH^-$.

A cation is contained in the compound having a calcium ion. The cation may be at least a $Ca^{2+}$ cation. In addition, the compound may also contain cations of metals such as Li, K, Na, Rb, Cs, Fr, Mg, Ca, Sr, Ba and Ra.

Examples of the compound having a calcium ion include $Ca(OH)_2$, $Ca(BH_4)_2$, $CaF_2$, $CaCl_2$, $CaBr_2$, $CaI_2$, $CaCO_3$, $CaNCN$, $CaFPO_3$, $CaHPO_4$, $Ca_3(PO_4)_2$, $Ca_2P_2O_7$, $Ca(NO_3)_2$, $Ca(NO_2)_2$, $Ca(ClO_4)_2$, $Ca(IO_3)_2$, $Ca(OCl)_2$, $Ca(H_2PO_4)_2$, $CaSO_4$, $CaS$ and $Ca(SCN)_2$.

(3) Compound Having a Thiocyanic Acid-Based or Sulfur Oxide-Based Anion

An anion is contained in the compound having a thiocyanic acid-based or sulfur oxide-based anion. The anion may be at least one kind of anion selected from the group consisting of $SCN^-$ and $S_2O_3^{2-}$. In addition, the compound may also contain $S^{2-}$, etc.

A cation is contained in the compound having a thiocyanic acid-based or sulfur oxide-based anion. The cation may be a cation of at least one kind of metal selected from the group consisting of Li, K, Na, Rb, Cs, Fr, Mg, Ca, Sr, Ba and Ra. Of them, the cation may be $K^+$ or $Na^+$.

Examples of the compound having a thiocyanic acid-based or sulfur oxide-based anion include $Na_2S_2O_3$ and NaSCN.

(4) Thiol-Based (Thiolate-Based) Compound

An anion is contained in the thiol-based (thiolate-based) compound. The anion may be at least $CH_3S^-$. In addition, the compound may also contain $CH_3CH_2S^-$, $CH_3CH_2CH_2S^-$, $(CH_3)_2CHS^-$, etc.

A cation is contained in the thiol-based (thiolate-based) compound. Examples of the cation include $H^+$, $Li^+$ and $Na^+$. Of them, the cation may be $Na^+$.

Examples of the thiol-based (thiolate-based) compound include $CH_3SH$, $CH_3SNa$ and $CH_3SLi$. Of them, the cation may be $CH_3SNa$.

The cation of the metal contained in the self-discharge inhibitor is the cation of a metal that is electrochemically baser than aluminum and magnesium. Accordingly, the cation is less reactive with aluminum and magnesium, which serve as anode metals in the electrolyte. Therefore, it is considered that the cation is less likely to disrupt the preferential adsorption of the anion to the impurity (e.g., iron) contained in the anode metal, the adsorption being directed toward the inhibition of self-discharge.

The combination of the self-discharge inhibitors may be a combination of at least one kind of compound selected from the group consisting of $Na_2H_2P_2O_7$ and $Ca(OH)_2$ and at least one kind of compound selected from the group consisting of $CH_3SNa$, $Na_2S_2O_3$ and NaSCN. From the viewpoint of obtaining the self-discharge inhibiting effect, the effect of inhibiting the coarsening of the discharge product, and an increase in battery capacity, the combination of two kinds of the compounds (self-discharge inhibitors) may be a combination of $Na_2H_2P_2O_7$ and NaSCN; the combination of three kinds of the compounds may be a combination of $Na_2H_2P_2O_7$, NaSCN and $Ca(OH)_2$; the combination of four kinds of the compounds may be a combination of $Na_2H_2P_2O_7$, $CH_3SNa$, NaSCN and $Ca(OH)_2$; and the combination of five kinds of the compounds may be a combination of $Na_2H_2P_2O_7$, $CH_3SNa$, $Na_2S_2O_3$, NaSCN and $Ca(OH)_2$.

The electrolyte compound is not particularly limited, as long as it is soluble in water and can offer desired ion conductivity. The electrolyte compound may be one that is able to make the aqueous solution neutral or basic. From the viewpoint of increasing electrode reactivity, the electrolyte compound may be one that is able to make the aqueous solution basic.

The electrolyte compound may be one that contains at least one kind of metal selected from the group consisting of Li, K, Na, Rb, Cs, Fr, Mg, Ca, Sr, Ba and Ra. Examples of the electrolyte compound include LiCl, NaCl, KCl, $MgCl_2$, $CaCl_2$, LiOH, NaOH, KOH, RbOH, CsOH, $Mg(OH)_2$, $Ca(OH)_2$ and $Sr(OH)_2$. Of them, the electrolyte compound may be NaOH and KOH, or it may be NaOH.

The concentration of the electrolyte compound is not particularly limited. The lower limit may be 0.01 mol/L or more, may be 0.1 mol/L or more, or may be 1 mol/L or more. The upper limit may be 20 mol/L or less, may be 10 mol/L or less, or may be 8 mol/L or less.

When the concentration of the electrolyte compound is less than 0.01 mol/L, the solubility of the anode metal may decrease. When the concentration of the electrolyte compound is more than 20 mol/L, the self-discharge of the metal-air battery is accelerated and may reduce battery characteristics.

The pH of the electrolyte may be 7 or more, may be 10 or more, or may be 14 or more.

2. Metal-Air Battery

The metal-air battery of the disclosed embodiments is a metal-air battery comprising: an air electrode configured to receive an oxygen supply; an anode containing at least one kind of metal element selected from aluminum and magnesium; and an electrolyte in contact with the air electrode and the anode.

In the disclosed embodiments, the metal-air battery is a battery in which a reduction reaction of oxygen, which is an active material, is carried out in the air electrode; an oxidation reaction of a metal element is carried out in the anode; and ions are conducted by the electrolyte disposed between the air electrode and the anode. Examples of the type of the metal-air battery include a magnesium-air primary battery and an aluminum-air primary battery.

FIG. 1 is a sectional view of a schematic configuration of the metal-air battery of the disclosed embodiments.

As shown in FIG. 1, a metal-air battery 10 includes an anode 11; an air electrode 12 disposed away from the anode 11; a separator 14 retaining an electrolyte 13 disposed between the anode 11 and the air electrode 12; an anode current collector 15 connected to the anode 11; an air electrode current collector 16 connected to the air electrode 12; and an outer case 17 housing these members. The outer case 17 is partly composed of a water repellent film 18. Using the water repellent film 18 and so on, the metal-air battery 10 is composed so that the electrolyte 13 does not leak from the outer case 17.

The electrolyte which is usable in the metal-air battery of the disclosed embodiments will not be described here since it is the same as the electrolyte described above under "1. Electrolyte for metal-air batteries".

As needed, the metal-air battery of the disclosed embodiments has the separator for insulating the air electrode and the anode from each other. From the viewpoint of retaining the electrolyte, the separator may have a porous structure. The porous structure of the separator is not particularly limited, as long as it can retain the electrolyte. Examples of the porous structure include a mesh structure in which constituent fibers are regularly arranged, a non-woven fabric structure in which constituent fibers are randomly arranged, and a three-dimensional network structure which has separate holes and connected holes. As the separator, conventionally-known separators can be used. Examples of the separator include porous films made of polyethylene, polypropylene, polyethylene terephthalate, cellulose, etc., and non-woven fabrics such as a resin non-woven fabric and a glass fiber non-woven fabric.

The thickness of the separator is not particularly limited. For example, it may be in a range of 0.1 to 200 micrometers (μm).

The porosity of the separator may be in a range of 30 to 90%, or it may be in a range of 45 to 70%. When the porosity is too small, the separator has a tendency to disturb ion diffusion. When the porosity is too high, the strength of the separator has a tendency to decrease.

The air electrode contains at least an electroconductive material.

The electroconductive material is not particularly limited, as long as it has electroconductivity. Examples of the electroconductive material include a carbonaceous material, a perovskite-type electroconductive material, a porous electroconductive polymer and a metal body.

The carbonaceous material may be a porous or non-porous carbonaceous material. The carbonaceous material may be a porous carbonaceous material. This is because it has a large specific surface area and can provide many reaction sites. Examples of the porous carbonaceous material include mesoporous carbon. Examples of the non-porous carbonaceous material include graphite, acetylene black, carbon black, carbon nanotubes and carbon fibers.

The metal body may be composed of a known metal that is stable to the electrolyte. More specifically, the metal body may be a metal body in which a metal layer (coating film) containing at least one kind of metal selected from the group consisting of, for example, Ni, Cr and Al is formed on the surface, or a metal body which is wholly composed of a metal material that is made of at least one kind of metal selected from the group consisting of Ni, Cr and Al. The form of the metal body may be a known form such as a metal mesh, a perforated metal foil or a foam metal.

The content of the electroconductive material in the air electrode may be in a range of 10 to 99% by mass, or it may be in a range of 50 to 95% by mass, when the total mass of the air electrode is determined as 100% by mass, for example.

The air electrode may contain a catalyst for promoting an electrode reaction. The catalyst may be carried on the electroconductive material.

As the catalyst, a known catalyst having an oxygen reduction ability and being usable in metal-air batteries, can be appropriately used. Examples of the catalyst include: at least one kind of metal selected from the group consisting of ruthenium, rhodium, palladium and platinum; a perovskite-type oxide containing a transition metal such as Co, Mn or Fe; a metal-coordinated organic compound having a porphyrin or phthalocyanine structure; an inorganic ceramic such as manganese dioxide ($MnO_2$) or cerium oxide ($CeO_2$); and a composite material made of a mixture of the above materials.

The content of the catalyst in the air electrode may be in a range of 0 to 90% by mass, or it may be in a range of 1 to 90% by mass, when the total mass of the air electrode is determined as 100% by mass, for example.

As needed, the air electrode contains a binder for fixing the electroconductive material.

Examples of the binder include polyvinylidene fluoride (PVdF), polytetrafluoroethylene (PTFE) and styrene-butadiene rubber (SBR).

The content of the binder in the air electrode is not particularly limited. The content may be in a range of 1 to 40% by mass, or it may be in a range of 10 to 30% by mass, when the total mass of the air electrode is determined as 100% by mass, for example.

Examples of the method for producing the air electrode include a method for mixing the above-described air electrode materials (such as the electroconductive material) and roll-pressing the mixture, and a method for applying a slurry containing the above-described air electrode materials and a solvent. Examples of the solvent used to prepare the slurry include acetone, ethanol and N-methyl-2-pyrrolidone (NMP). Examples of the method for applying the slurry include a spraying method, a screen printing method, a gravure printing method, a die coating method, a doctor blade method and an inkjet method. More specifically, the air electrode can be formed by applying the slurry to the below-described air electrode current collector or carrier film, drying the applied slurry, and then roll-pressing and cutting the dried slurry, as needed.

The thickness of the air electrode may vary depending on the specific application of the metal-air battery, etc. For example, the thickness may be in a range of 2 to 500 μm, or it may be in a range of 30 to 300 μm.

As needed, the metal-air battery of the disclosed embodiments has the air electrode current collector for collecting current from the air electrode. The air electrode current collector may be one having a porous structure or one having a dense structure, as long as it has desired electron conductivity. From the viewpoint of air (oxygen) diffusivity, it may be one having a porous structure such as a mesh structure. Examples of the form of the air electrode current collector include a foil form, a plate form and a mesh (grid) form. The porosity of the current collector having the porous structure is not particularly limited. For example, it may be in a range of 20 to 99%.

Examples of the material for the air electrode current collector include metal materials such as stainless-steel, nickel, aluminum, iron, titanium, copper, gold, silver and palladium; carbonaceous materials such as carbon fiber and carbon paper; and highly electron conductive ceramic materials such as titanium nitride.

The thickness of the air electrode current collector is not particularly limited. For example, it may be in a range of 10 to 1000 μm, or it may be in a range of 20 to 400 μm. The below-described outer case may also function as the air electrode current collector.

The air electrode current collector may have a terminal that serves as a connection to the outside.

The anode contains at least an anode active material.

Examples of the anode active material include an aluminum metal, a magnesium metal, an aluminum alloy, a magnesium alloy, an aluminum compound and a magnesium compound. Of them, the anode active material may be an aluminum metal.

Examples of the aluminum alloy include an alloy of aluminum and a metal material selected from the group consisting of vanadium, silicon, magnesium, iron, zinc and lithium. The metal constituting the aluminum alloy (that is, the metal other than aluminum) may be one or more kinds of metals.

Examples of the aluminum compound include aluminum (III) nitrate, aluminum(III) chloride oxide, aluminum(III) oxalate, aluminum(III) bromide, and aluminum(III) iodide.

When the anode is the aluminum metal, the purity of the aluminum is not particularly limited. For the element ratio of the aluminum contained in the aluminum metal, the lower limit may be 50% or more, may be 80% or more, may be 95% or more, or may be 99.5% or more. Also, the upper limit may be less than 99.999%, may be 99.99% or less, or may be 99.9% or less. The aluminum metal may also contain iron. The element ratio of the iron contained in the aluminum metal is not particularly limited. It may be less than 0.001%, may be less than 0.01%, or may be less than 0.1%.

In the aluminum alloy, the content of the aluminum may be 50% by mass or more, when the total mass of the alloy is determined as 100% by mass.

The form of the anode is not particularly limited. Examples of the form include a plate form, a rod form and a particulate form. From the viewpoint of the form that can easily increase the performance of the metal-air battery, the form of the anode may be a particulate form. When the anode is in a particulate form, the lower limit of the diameter of the particles may be 1 nm or more, may be 10 nm or more, or may be 100 nm or more, and the upper limit of the diameter of the particles may be 100 millimeters (mm) or less, may be 10 mm or less, or may be 1 mm or less.

In the disclosed embodiments, the average particle diameter of the particles is calculated by a general method. An example of the method for calculating the average particle diameter of the particles is as follows. First, for a particle shown in an image taken at an appropriate magnitude (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

As needed, the anode contains at least one of the electroconductive material and the binder for fixing the anode active material. For example, when the anode active material is in a plate form, the anode can be an anode that contains only the anode active material. On the other hand, when the anode active material is a powder (particulate) form, the anode can be an anode that contains the anode active material and at least one of the electroconductive material and the binder. The type and amount of the electroconductive material used, the type and amount of the binder used, etc., can be the same as those of the air electrode described above.

As needed, the metal-air battery of the disclosed embodiments has the anode current collector for collecting current from the anode. The material for the anode current collector is not particularly limited, as long as it has electroconductivity. Examples of the material for the anode current collector include stainless-steel, nickel, copper and carbon. Examples of the form of the anode current collector include a foil form, a plate form and a mesh form. The thickness of the anode current collector is not particularly limited. For example, the thickness may be in a range of 10 to 1000 μm, or it may be in a range of 20 to 400 μm. The below-described outer case may also function as the anode current collector.

The anode current collector may have a terminal that serves as a connection to the outside.

The metal-air battery of the disclosed embodiments generally has the outer case for housing the air electrode, the anode, the electrolyte, etc.

Examples of the form of the outer case include a coin form, a flat plate form, a cylindrical form and a laminate form.

The material for the outer case is not particularly limited, as long as it is stable to the electrolyte. Examples of the material for the outer case include a metal body that contains at least one kind of metal selected from the group consisting of Ni, Cr and Al, and a resin such as polypropylene, polyethylene or acrylic resin. When the outer case is the metal body, the outer case may be such that only the surface is composed of the metal body, or such that the outer case is wholly composed of the metal body.

The outer case may be an open-to-the-atmosphere type or a hermetically-closed type. The open-to-the-atmosphere type outer case has an opening for taking in oxygen from the outside (i.e., an oxygen inlet) and has a structure that allows at least the air electrode to be in sufficient contact with the atmosphere. The oxygen inlet may be provided with an oxygen permeable film, a water repellent film, etc. The hermetically-closed type battery case may have an oxygen (air) inlet tube and an outlet tube.

The water repellent film is not particularly limited, as long as it is made of a material that does not leak the electrolyte and allows the air to reach the air electrode. Examples of the water repellent film include a porous fluorine resin sheet (such as PTFE) and water-repellent, porous cellulose.

An oxygen-containing gas is supplied to the air electrode. Examples of the oxygen-containing gas include air, dry air and pure oxygen. The oxygen-containing gas may be dry air or pure oxygen, or it may be pure oxygen.

EXAMPLES

Example 1

First, an aqueous solution of 1 moles per liter (mol/L) NaOH (manufactured by Kanto Chemical Co., Inc.) was prepared. In a thermostatic bath (product name: LU-113; manufactured by: ESPEC Corp.), the aqueous solution was kept at 25° C. for 8 hours. Then, as a self-discharge inhibitor, $Na_2H_2P_2O_7$ (manufactured by Aldrich) and $CH_3SNa$ (manufactured by Aldrich) were added to the aqueous solution so as to be 0.01 mol/L each. Next, the aqueous solution was stirred with an ultrasonic washing machine for 15 minutes. Then, in the thermostatic bath, the aqueous solution was kept at 25° C. for 3 hours, thereby obtaining an electrolyte for metal-air batteries.

Example 2

An electrolyte for metal-air batteries was produced in the same manner as Example 1, except that as the self-discharge inhibitor, $Na_2H_2P_2O_7$ and $Na_2S_2O_3$ (manufactured by Aldrich) were added to the aqueous solution so as to be 0.01 mol/L each.

Example 3

An electrolyte for metal-air batteries was produced in the same manner as Example 1, except that as the self-discharge inhibitor, $Na_2H_2P_2O_7$ and NaSCN (manufactured by Aldrich) were added to the aqueous solution so as to be 0.01 mol/L each.

Example 4

An electrolyte for metal-air batteries was produced in the same manner as Example 1, except that as the self-discharge inhibitor, $CH_3SNa$ and $Ca(OH)_2$ (manufactured by Aldrich) were added to the aqueous solution so as to be 0.01 mol/L each.

Example 5

An electrolyte for metal-air batteries was produced in the same manner as Example 1, except that as the self-discharge inhibitor, $Na_2S_2O_3$ and $Ca(OH)_2$ were added to the aqueous solution so as to be 0.01 mol/L each.

Example 6

An electrolyte for metal-air batteries was produced in the same manner as Example 1, except that as the self-discharge inhibitor, NaSCN and $Ca(OH)_2$ were added to the aqueous solution so as to be 0.01 mol/L each.

Example 7

An electrolyte for metal-air batteries was produced in the same manner as Example 1, except that as the self-discharge inhibitor, $Na_2H_2P_2O_7$, $CH_3SNa$ and $Na_2S_2O_3$ were added to the aqueous solution so as to be 0.01 mol/L each.

Example 8

An electrolyte for metal-air batteries was produced in the same manner as Example 1, except that as the self-discharge inhibitor, $Na_2H_2P_2O_7$, $CH_3SNa$ and NaSCN were added to the aqueous solution so as to be 0.01 mol/L each.

Example 9

An electrolyte for metal-air batteries was produced in the same manner as Example 1, except that as the self-discharge inhibitor, $Na_2H_2P_2O_7$, $CH_3SNa$ and $Ca(OH)_2$ were added to the aqueous solution so as to be 0.01 mol/L each.

Example 10

An electrolyte for metal-air batteries was produced in the same manner as Example 1, except that as the self-discharge inhibitor, $Na_2H_2P_2O_7$, $Na_2S_2O_3$ and NaSCN were added to the aqueous solution so as to be 0.01 mol/L each.

Example 11

An electrolyte for metal-air batteries was produced in the same manner as Example 1, except that as the self-discharge inhibitor, $Na_2H_2P_2O_7$, $Na_2S_2O_3$ and $Ca(OH)_2$ were added to the aqueous solution so as to be 0.01 mol/L.

Example 12

An electrolyte for metal-air batteries was produced in the same manner as Example 1, except that as the self-discharge inhibitor, $Na_2H_2P_2O_7$, NaSCN and $Ca(OH)_2$ were added to the aqueous solution so as to be 0.01 mol/L each.

Example 13

An electrolyte for metal-air batteries was produced in the same manner as Example 1, except that as the self-discharge inhibitor, $CH_3SNa$, $Na_2S_2O_3$ and $Ca(OH)_2$ were added to the aqueous solution so as to be 0.01 mol/L.

Example 14

An electrolyte for metal-air batteries was produced in the same manner as Example 1, except that as the self-discharge inhibitor, $CH_3SNa$, NaSCN and $Ca(OH)_2$ were added to the aqueous solution so as to be 0.01 mol/L each.

Example 15

An electrolyte for metal-air batteries was produced in the same manner as Example 1, except that as the self-discharge inhibitor, $Na_2S_2O_3$, NaSCN and $Ca(OH)_2$ were added to the aqueous solution so as to be 0.01 mol/L each.

Example 16

An electrolyte for metal-air batteries was produced in the same manner as Example 1, except that as the self-discharge inhibitor, $Na_2H_2P_2O_7$, $CH_3SNa$, $Na_2S_2O_3$ and NaSCN were added to the aqueous solution so as to be 0.01 mol/L each.

Example 17

An electrolyte for metal-air batteries was produced in the same manner as Example 1, except that as the self-discharge inhibitor, $Na_2H_2P_2O_7$, $CH_3SNa$, $Na_2S_2O_3$ and $Ca(OH)_2$ were added to the aqueous solution so as to be 0.01 mol/L each.

Example 18

An electrolyte for metal-air batteries was produced in the same manner as Example 1, except that as the self-discharge inhibitor, $Na_2H_2P_2O_7$, $CH_3SNa$, NaSCN and $Ca(OH)_2$ were added to the aqueous solution so as to be 0.01 mol/L each.

Example 19

An electrolyte for metal-air batteries was produced in the same manner as Example 1, except that as the self-discharge inhibitor, $Na_2H_2P_2O_7$, $CH_3SNa$, $Na_2S_2O_3$, NaSCN and $Ca(OH)_2$ were added to the aqueous solution so as to be 0.01 mol/L each.

Comparative Example 1

An electrolyte for metal-air batteries was produced in the same manner as Example 1, except that the self-discharge inhibitor was not added.

Comparative Example 2

An electrolyte for metal-air batteries was produced in the same manner as Example 1, except that as the self-discharge inhibitor, $Na_2H_2P_2O_7$ was added to the aqueous solution so as to be 0.01 mol/L.

Comparative Example 3

An electrolyte for metal-air batteries was produced in the same manner as Example 1, except that as the self-discharge inhibitor, $CH_3SNa$ was added to the aqueous solution so as to be 0.01 mol/L.

Comparative Example 4

An electrolyte for metal-air batteries was produced in the same manner as Example 1, except that as the self-discharge inhibitor, $Na_2S_2O_3$ was added to the aqueous solution so as to be 0.01 mol/L.

Comparative Example 5

An electrolyte for metal-air batteries was produced in the same manner as Example 1, except that as the self-discharge inhibitor, NaSCN was added to the aqueous solution so as to be 0.01 mol/L.

Comparative Example 6

An electrolyte for metal-air batteries was produced in the same manner as Example 1, except that as the self-discharge inhibitor, $Ca(OH)_2$ was added to the aqueous solution so as to be 0.01 mol/L.

Comparative Example 7

An electrolyte for metal-air batteries was produced in the same manner as Example 1, except that as the self-discharge inhibitor, $CH_3SNa$ and $Na_2S_2O_3$ were added to the aqueous solution so as to be 0.01 mol/L each.

Comparative Example 8

An electrolyte for metal-air batteries was produced in the same manner as Example 1, except that as the self-discharge inhibitor, $CH_3SNa$ and NaSCN were added to the aqueous solution so as to be 0.01 mol/L each.

Comparative Example 9

An electrolyte for metal-air batteries was produced in the same manner as Example 1, except that as the self-discharge inhibitor, $Na_2S_2O_3$ and NaSCN were added to the aqueous solution so as to be 0.01 mol/L each.

Comparative Example 10

An electrolyte for metal-air batteries was produced in the same manner as Example 1, except that as the self-discharge inhibitor, $CH_3SNa$, $Na_2S_2O_3$ and NaSCN were added to the aqueous solution so as to be 0.01 mol/L each.

[Evaluation of Self-Discharge Inhibition]
(Preparation of Electrodes)

As a working electrode, an aluminum plate having a purity of 99.5% (product name: Al2N; manufactured by: Nilaco Corporation) and being cut into a size of 25 mm×25 mm×1 mm was prepared. The surface of the aluminum plate was wiped with acetone. Then, the aluminum plate was sandwiched between nickel meshes (product name: 20 mesh; manufactured by: Nilaco Corporation) and the edges of the nickel meshes were welded to each other. A nickel ribbon (manufactured by Nilaco Corporation) was welded thereto and used as a current collection wiring.

As a counter electrode, a nickel mesh (product name: 100 mesh; manufactured by: Nilaco Corporation) cut into a size of 30 mm×30 mm×1 mm was prepared. A nickel ribbon (manufactured by Nilaco Corporation) was welded to the nickel mesh and used as a current collection wiring.

As a reference electrode, an Hg/HgO electrode was prepared.
(Production of Evaluation Cells)

As electrolytes, the electrolytes of Examples 1 to 19 and Comparative Examples 1 to 10 were prepared (200 mL each).

Next, 29 cell containers (volume 220 mL each) were prepared. The number of the cell containers is equal to the total number of the electrolytes of Examples 1 to 19 and Comparative Examples 1 to 10. In each cell container, the working electrode, the counter electrode and the reference electrode were placed. The electrolytes (200 mL each) were separately put in the cell containers. The cell containers were capped to prevent volatilization, thereby preparing evaluation cells. The production of the evaluation cells was carried out within 10 minutes.

(Measurement of Open-Circuit Potential Holding Time)

For each of the evaluation cells using the electrolytes of Examples 1 to 19 and Comparative Examples 1 to 10, the open-circuit potential (OCV) holding time of the aluminum electrode (working electrode) was measured. In particular, the working and counter electrodes of each evaluation cell were connected to a potentiostat/galvanostat (product name: VMP3; manufactured by: Biologic); an open circuit was created at an ambient temperature of 25° C. for 30 hours; and the time for the potential of the working electrode to rapidly increase from about −1.3 volts (V) (vs. Hg/HgO) at the beginning of the measurement to −1.0 V (vs. Hg/HgO) was measured.

The open-circuit potential holding time means a time during which the self-discharge reaction proceeds and the aluminum electrode is completely eluted. Accordingly, it is considered that as the open-circuit potential holding time increases, the self-discharge rate decreases, thereby inhibiting self-discharge. The results of the measurement of the open-circuit potential holding time are shown in Table 1.

TABLE 1

| | | Type and estimated mechanism of self-discharge inhibitor | | | | | Self discharge inhibition | | | |
|---|---|---|---|---|---|---|---|---|---|---|
| | | Adsorption to impurity phase | | Refinement of discharge product | | Deposition of cation | OCV holding | Ratio to Comparative | Ratio to Comparative | Refinement of |
| | Self-discharge inhibitor | $Na_2H_2P_2O_7$ | $CH_3SNa$ | $Na_2S_2O_3$ | NaSCN | $Ca(OH)_2$ | time (hr) | Example 1 | Example 2 | product |
| Comparative Example 1 | Not added | — | — | — | — | — | 6.9 | — | 0.47 | No |
| Comparative Example 2 | One kind of self-discharge inhibitor (alone) | $Na_2H_2P_2O_7$ | — | — | — | — | 14.6 | 2.12 | — | No |
| Comparative Example 3 | | — | $CH_3SNa$ | — | — | — | 11.4 | 1.65 | 0.78 | No |
| Comparative Example 4 | | — | — | $Na_2S_2O_3$ | — | — | 8.8 | 1.28 | 0.60 | Yes |
| Comparative Example 5 | | — | — | — | NaSCN | — | 9.8 | 1.42 | 0.67 | Yes |
| Comparative Example 6 | | — | — | — | — | $Ca(OH)_2$ | 12.6 | 1.83 | 0.86 | No |
| Example 1 | Combination of two kinds of self-discharge inhibitors | $Na_2H_2P_2O_7$ | $CH_3SNa$ | — | — | — | 25.0 | 3.62 | 1.71 | No |
| Example 2 | | $Na_2H_2P_2O_7$ | — | $Na_2S_2O_3$ | — | — | 19.0 | 2.75 | 1.30 | Yes |
| Example 3 | | $Na_2H_2P_2O_7$ | — | — | NaSCN | — | 24.3 | 3.52 | 1.66 | Yes |
| Comparative Example 7 | | — | $CH_3SNa$ | $Na_2S_2O_3$ | — | — | 9.1 | 1.32 | 0.62 | Yes |
| Comparative Example 8 | | — | $CH_3SNa$ | — | NaSCN | — | 11.0 | 1.59 | 0.75 | No |
| Example 4 | | — | $CH_3SNa$ | — | — | $Ca(OH)_2$ | 21.0 | 3.04 | 1.44 | No |
| Comparative Example 9 | | — | — | $Na_2S_2O_3$ | NaSCN | — | 8.6 | 1.25 | 0.59 | Yes |
| Example 5 | | — | — | $Na_2S_2O_3$ | — | $Ca(OH)_2$ | 16.7 | 2.42 | 1.14 | Yes |
| Example 6 | | — | — | — | NaSCN | $Ca(OH)_2$ | 18.1 | 2.62 | 1.24 | Yes |
| Example 7 | Combination of three kinds of self-discharge inhibitors | $Na_2H_2P_2O_7$ | $CH_3SNa$ | $Na_2S_2O_3$ | — | — | 19.6 | 2.84 | 1.34 | Yes |
| Example 8 | | $Na_2H_2P_2O_7$ | $CH_3SNa$ | — | NaSCN | — | 26.9 | 3.90 | 1.84 | No |
| Example 9 | | $Na_2H_2P_2O_7$ | $CH_3SNa$ | — | — | $Ca(OH)_2$ | 28.5 | 4.13 | 1.95 | No |
| Example 10 | | $Na_2H_2P_2O_7$ | — | $Na_2S_2O_3$ | NaSCN | — | 19.5 | 2.83 | 1.34 | Yes |
| Example 11 | | $Na_2H_2P_2O_7$ | — | $Na_2S_2O_3$ | — | $Ca(OH)_2$ | 22.2 | 3.22 | 1.52 | Yes |
| Example 12 | | $Na_2H_2P_2O_7$ | — | — | NaSCN | $Ca(OH)_2$ | 27.0 | 3.91 | 1.85 | Yes |
| Comparative Example 10 | | — | $CH_3SNa$ | $Na_2S_2O_3$ | NaSCN | — | 9.9 | 1.43 | 0.68 | Yes |

TABLE 1-continued

| | Self-discharge inhibitor | Type and estimated mechanism of self-discharge inhibitor | | | | Self discharge inhibition | | | |
|---|---|---|---|---|---|---|---|---|---|
| | | Adsorption to impurity phase | | Refinement of discharge product | | Deposition of cation | OCV holding time (hr) | Ratio to Comparative Example 1 | Ratio to Comparative Example 2 | Refinement of product |
| | | $Na_2H_2P_2O_7$ | $CH_3SNa$ | $Na_2S_2O_3$ | NaSCN | $Ca(OH)_2$ | | | | |
| Example 13 | | — | $CH_3SNa$ | $Na_2S_2O_3$ | — | $Ca(OH)_2$ | 19.0 | 2.75 | 1.30 | Yes |
| Example 14 | | — | $CH_3SNa$ | — | NaSCN | $Ca(OH)_2$ | 22.0 | 3.19 | 1.51 | No |
| Example 15 | | — | — | $Na_2S_2O_3$ | NaSCN | $Ca(OH)_2$ | 16.8 | 2.43 | 1.15 | Yes |
| Example 16 | Combination of four kinds of self-discharge inhibitors | $Na_2H_2P_2O_7$ | $CH_3SNa$ | $Na_2S_2O_3$ | NaSCN | — | 21.4 | 3.10 | 1.47 | Yes |
| Example 17 | | $Na_2H_2P_2O_7$ | $CH_3SNa$ | $Na_2S_2O_3$ | — | $Ca(OH)_2$ | 23.0 | 3.33 | 1.58 | Yes |
| Example 18 | | $Na_2H_2P_2O_7$ | $CH_3SNa$ | — | NaSCN | $Ca(OH)_2$ | 26.0 | 3.77 | 1.78 | Yes |
| Example 19 | Combination of five kinds of self-discharge inhibitors | $Na_2H_2P_2O_7$ | $CH_3SNa$ | $Na_2S_2O_3$ | NaSCN | $Ca(OH)_2$ | 25.2 | 3.65 | 1.73 | Yes |

As shown in Table 1, the open-circuit potential holding times of the evaluation cells using the electrolytes of Examples 1 to 19 and Comparative Examples 1 to 10 are as follows: 25 hours in Example 1; 19 hours in Example 2; 24.3 hours in Example 3; 21 hours in Example 4; 16.7 hours in Example 5; 18.1 hours in Example 6; 19.6 hours in Example 7; 26.9 hours in Example 8; 28.5 hours in Example 9; 19.5 hours in Example 10; 22.2 hours in Example 11; 27 hours in Example 12; 19 hours in Example 13; 22 hours in Example 14; 16.8 hours in Example 15; 21.4 hours in Example 16; 23 hours in Example 17; 26 hours in Example 18; 25.2 hours in Example 19; 6.9 hours in Comparative Example 1; 14.6 hours in Comparative Example 2; 11.4 hours in Comparative Example 3; 8.8 hours in Comparative Example 4; 9.8 hours in Comparative Example 5; 12.6 hours in Comparative Example 6; 9.1 hours in Comparative Example 7; 11 hours in Comparative Example 8; 8.6 hours in Comparative Example 9; and 9.9 hours in Comparative Example 10.

As shown in Table 1, it is clear that the open-circuit potential holding times of Examples 1 to 19 are 2.4 to 4.1 times longer than the open-circuit potential holding time of Comparative Example 1.

As shown in Table 1, it is also clear that the open-circuit potential holding times of Examples 1 to 19 are 1.1 to 2.0 times longer than the open-circuit potential holding time of Comparative Example 2, which is the longest among Comparative Examples 1 to 10.

Therefore, it was confirmed that by adding the self-discharge inhibitors of the specific combinations of Examples 1 to 19 to the electrolyte, a higher self-discharge inhibiting effect than Comparative Example 2, in which $Na_2H_2P_2O_7$ showing the highest self-discharge inhibiting effect alone was used, was obtained.

It is also clear that Examples 2, 3, 5 to 7, 10 to 13 and 15 to 19 have the self-discharge inhibiting effect and the effect of refining the discharge product. It was found that the self-discharge inhibiting effects of Examples 3, 12 and 17 to 19 are particularly high.

It was found that the open-circuit potential holding time of Example 9 is particularly long. However, the effect of refining the discharge product was not confirmed in Example 9.

[Observation of the Form of Discharge Products]

The electrolytes of Examples 1 to 19 and Comparative Examples 1 to 10 were prepared (50 mL each). They were separately put in different containers. Next, aluminum plates having a purity of 99.5% (product name: Al2N; manufactured by: Nilaco Corporation) and being cut into a size of 12 mm×12 mm×1 mm (about 0.4 g) were prepared. The surfaces of the aluminum plates were wiped with acetone. Then, the aluminum plates were separately put in the containers. A paper was placed on the top of each container, and each container was loosely capped. Thereby, hydrogen was prevented from remaining in the containers, and natural volatilization of the electrolytes was inhibited. Then, each container was put in a thermostatic bath, kept at 25° C., and allowed to stand until the generation of bubbles inside the container finished. Images of the appearance of the inside of the containers after the bubble generation finished, are shown in FIG. 2.

Figure 2:
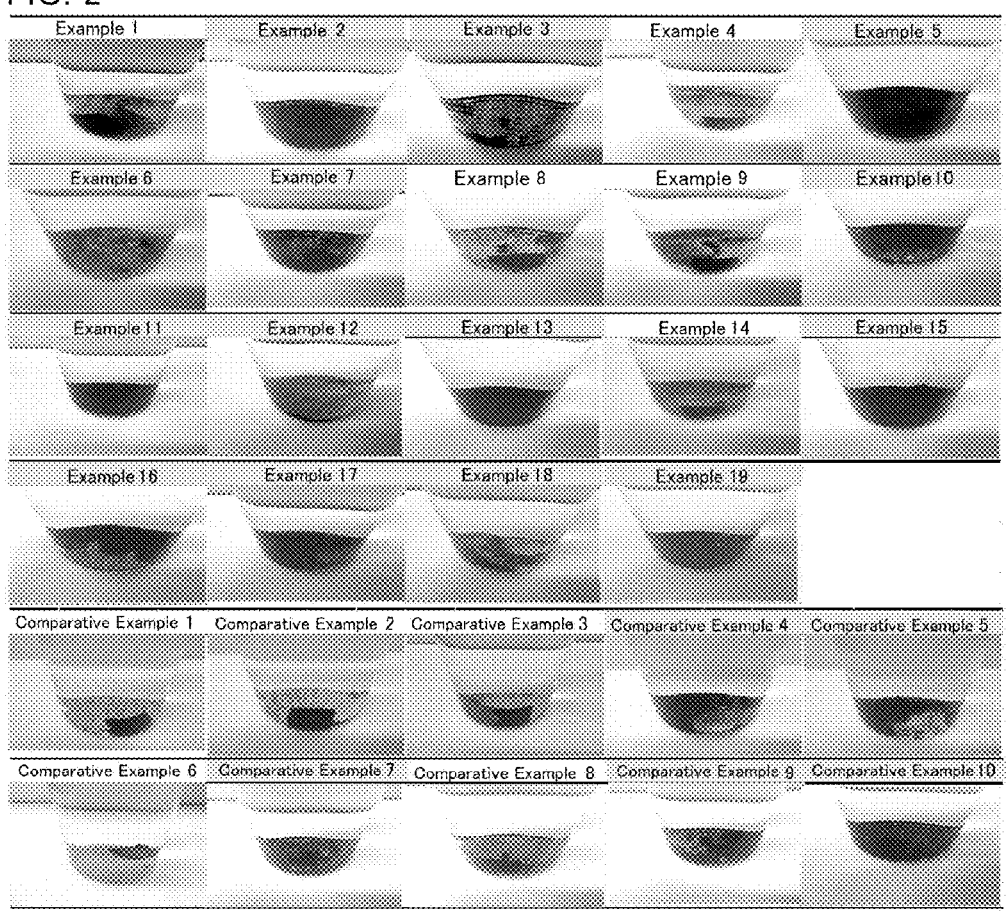
FIG. 2 shows images of the appearance of aluminum plates dissolved using the electrolytes of Examples 1 to 19 and Comparative Examples 1 to 10.

As shown in FIG. 2, in Examples 1, 4, 8, 9 and 14 and Comparative Examples 1 to 3, 6 and 8, it is clear that a discharge product was formed in the form of large lumps, which reflect the form of the original aluminum plate.

Meanwhile, in other Examples and Comparative Examples, it is clear that a discharge product was refined and in the form of powder.

The reason why the discharge product was refined is considered as follows.

First, by energy dispersive X-ray analysis (EDX), it is clear that the ratio of iron contained in the lumps of the coarsened discharge product is larger than the ratio of iron contained as an impurity in the early aluminum plate. Accordingly, it is considered that the iron contained in the aluminum metal as an impurity, is highly involved in the coarsening of the discharge product. Also, it is known that $S_2O_3^{2-}$ and $SCN^-$ anions form a complex with an iron ion. Also, as shown in FIG. 2, the discharge product itself still remains even after the addition of the self-discharge inhibitor containing an $S_2O_3^{2-}$ anion and/or $SCN^-$ anion. Therefore, it is considered that $S_2O_3^{2-}$ and $SCN^-$ anions are not involved in complex formation with the aluminum which is the main element of the anode metal.

Due to the above reasons, it is considered that because the self-discharge inhibitor containing $S_2O_3^{2-}$ and $SCN^-$ anions is contained in the electrolyte, the elution of the iron was promoted, and because of the effect of inhibiting the coarsening of the discharge product, which is exerted by the stabilization of dissolved iron ions, the refinement as shown in FIG. 2 was caused.

However, as an exception, it was found that as shown in Comparative Example 8 and Examples 8 and 14 in FIG. 2, the discharge product is not refined when the self-discharge inhibitor contains $CH_3SNa$ and $NaSCN$ and does not contain $Na_2S_2O_3$. When the self-discharge inhibitor contains $SCN^-$ and $CH_3S^-$ anions and does not contain any $H_2P_2O_7^{2-}$ anion, it is estimated that the effect of inhibiting the coarsening of the discharge product was not obtained since the anions have S and are similar in action site.

Even in the case of using a magnesium metal in electrodes, it is considered that the self-discharge inhibitor containing an $S_2O_3^{2-}$ anion and/or $SCN^-$ anion is not involved in complex formation with the magnesium, since magnesium is a metal that is, like aluminum, electrochemically baser than iron.

[Confirmation of Influence of Refining of Discharge Product]

(Preparation of Electrodes)

As a working electrode, an aluminum plate having a purity of 99.5% (product name: Al2N; manufactured by: Nilaco Corporation) and being cut into a size of 25 mm×25 mm×1 mm was prepared. The surface of the aluminum plate was wiped with acetone. Then, the aluminum plate was sandwiched between nickel meshes (product name: 20 mesh; manufactured by: Nilaco Corporation) and the edges of the nickel meshes were welded to each other. A nickel ribbon (manufactured by Nilaco Corporation) was welded thereto and used as a current collection wiring.

As a counter electrode, a nickel mesh (product name: 100 mesh; manufactured by: Nilaco Corporation) cut into a size of 30 mm×30 mm×1 mm was prepared. A nickel ribbon was welded to the nickel mesh and used as a current collection wiring.

As a reference electrode, an Hg/HgO electrode was prepared.

(Production of Evaluation Cells)

The electrolytes of Comparative Example 1 and Examples 1, 2, 9 and 12 were prepared (220 mL each).

Of the above electrolytes, the electrolyte of Example 2 contains an $S_2O_3^{2-}$ anion, and the electrolyte of Example 12 contains an $SCN^-$ anion. Meanwhile, the electrolytes of Examples 1 and 9 and Comparative Example 1 do not contain any $S_2O_3^{2-}$ anion and $SCN^-$ anion.

Next, 5 cell containers (volume 240 mL each) were prepared. The number of the cell containers is equal to the total number of the electrolytes of Comparative Example 1 and Examples 1, 2, 9 and 12. In each cell container, the working electrode, the counter electrode and the reference electrode were placed. The electrolytes (200 mL each) were separately put in the cell containers. The cell containers were capped to prevent volatilization, thereby producing evaluation cells. The production of the evaluation cells was carried out within 10 minutes.

(Discharge Test)

The discharge test was carried out using the evaluation cells. In particular, the working and counter electrodes of each evaluation cell were connected to a potentiostat/galvanostat (product name: VMP3; manufactured by: Biologic). The discharge test was carried out under the conditions of an ambient temperature of 25° C. and 400 mA.

Figure 3:
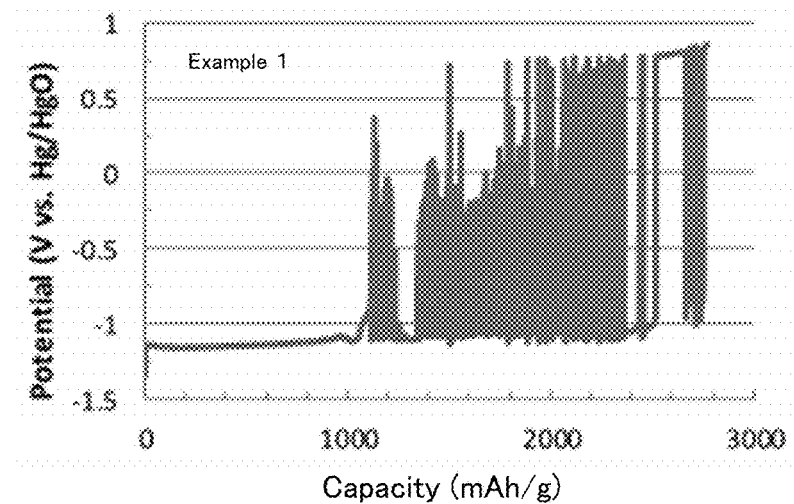
FIG. 3 is a view of a discharge curve for an evaluation cell using the electrolyte of Example 1.
Figure 4:
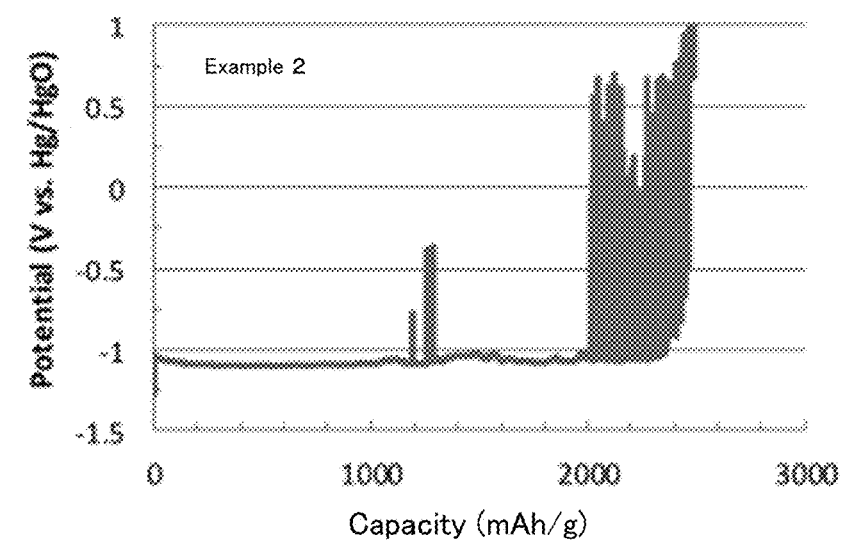
FIG. 4 is a view of a discharge curve for an evaluation cell using the electrolyte of Example 2.
Figure 5:
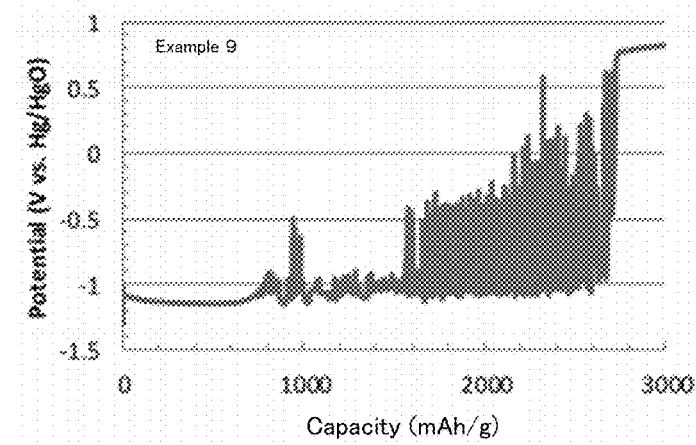
FIG. 5 is a view of a discharge curve for an evaluation cell using the electrolyte of Example 9.
Figure 6:
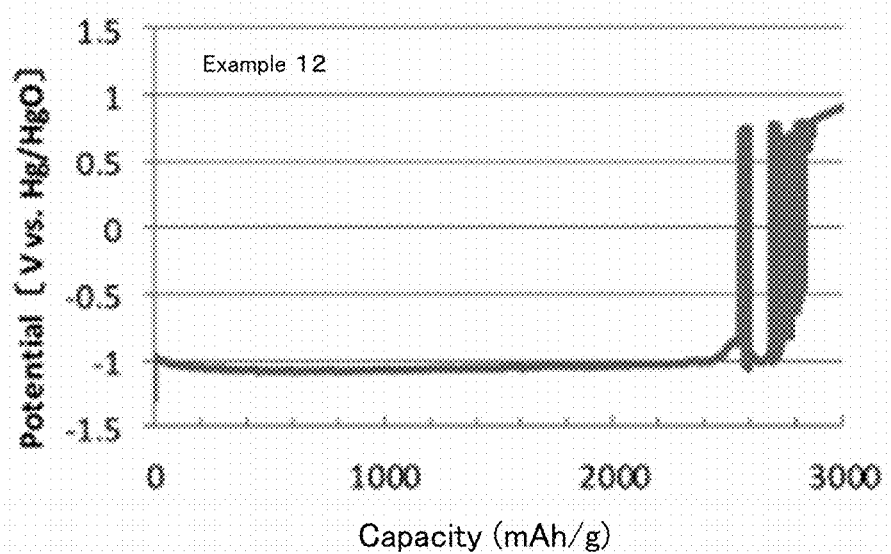
FIG. 6 is a view of a discharge curve for an evaluation cell using the electrolyte of Example 12.
Figure 7:
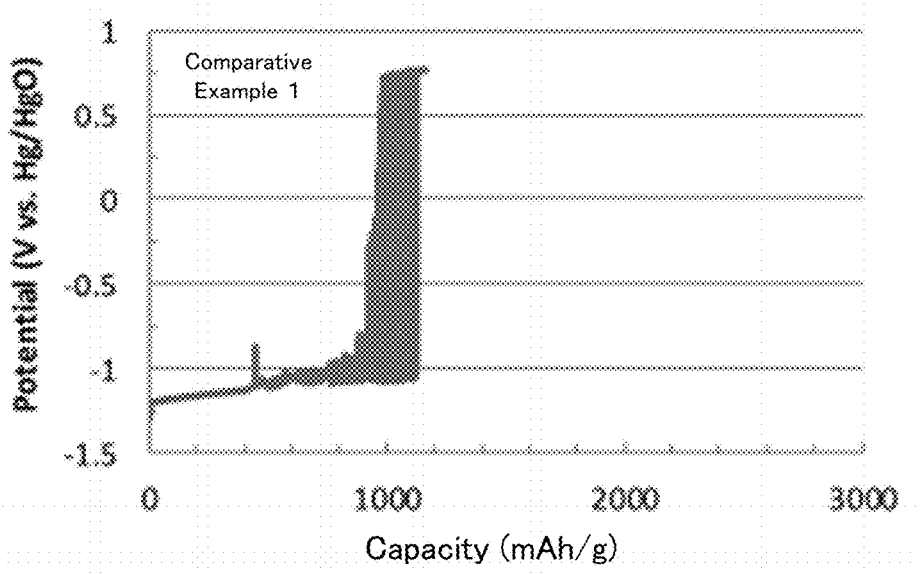
FIG. 7 is a view of a discharge curve for an evaluation cell using the electrolyte of Comparative Example 1.

The results of the discharge test are shown in FIG. 3 (Example 1), FIG. 4 (Example 2), FIG. 5 (Example 9), FIG. 6 (Example 12) and FIG. 7 (Comparative Example 1). FIGS. 3 to 7 show the constant current discharge curves of the evaluation cells using the electrolytes obtained in Comparative Example 1 and Examples 1, 2, 9 and 12. The potential in FIGS. 3 to 7 is based on the potential of the Hg/HgO reference electrode. Accordingly, hereinafter, potential will be shown on the basis of Hg/HgO.

As is clear from FIG. 7, in Comparative Example 1, noise occurs often at and later than 500 mAh/g. It is considered that the cause for the noise generation in Comparative Example 1 is the influence of the discharge product produced between the nickel mesh and the aluminum plate, which were used for current collection in the working electrode. The reason for this is because the noise as shown in FIG. 7 was not generated in the case where, as a preliminary test, the discharge test was carried out using the electrolyte of Comparative Example 1 and by connecting the wiring directly to the aluminum electrode, without the use of nickel mesh as the current collector of the working electrode (not shown).

Meanwhile, as shown in FIGS. 3 and 5, it is clear that no noise occurred at all until around 1000 mAh/g in Examples 1 and 9. Therefore, it is clear that the capacities of Examples 1 and 9 are higher compared to Comparative Example 1. This is considered to be due to the self-discharge inhibiting effect.

Also, as shown in FIG. 4, almost no noise occurs until around 2000 mAh/g in Example 2. As shown in FIG. 6, no noise occurs at all until around 2600 mAh/g in Example 12. Therefore, it is clear that the capacities of Examples 2 and 12 containing an $S_2O_3^{2-}$ anion or $SCN^-$ anion, are much higher than Examples 1 and 9 not containing any $S_2O_3^{2-}$ anion or $SCN^-$ anion. It is considered that this is due to the self-discharge inhibiting effect and the effect of refining the discharge product, which is exerted by the $S_2O_3^{2}$ anion or $SCN^-$ anion.

From the above, it is clear that due to the effect of refining the discharge product, noise is reduced at the time of the evaluation of discharge, and the capacity is significantly increased until the worsening of noise.

The invention claimed is:

1. A metal-air battery comprising:
   an air electrode configured to receive an oxygen supply;
   an anode containing iron as an impurity and at least one kind of metal element selected from aluminum and magnesium; and
   an electrolyte in contact with the air electrode and the anode, the electrolyte comprising an aqueous solution comprising a self-discharge inhibitor containing at least one kind of ion selected from the group consisting of an $H_2P_2O_7^{2-}$ anion and a $Ca^{2+}$ cation and at least one kind of ion selected from the group consisting of a $CH_3S^-$ anion, an $S_2O_3^{2-}$ anion and an $SCN^-$ anion.

2. The metal-air battery according to claim 1, wherein the self-discharge inhibitor comprises at least one selected from the group consisting of $Na_2H_2P_2O_7$ and $Ca(OH)_2$ and at least one selected from the group consisting of $CH_3SNa$, $Na_2S_2O_3$ and $NaSCN$.

3. The metal-air battery according to claim 1, wherein a content of the self-discharge inhibitor is in a range of 0.001 mol/L or more to 0.1 mol/L or less.

4. The metal-air battery according to claim 1, wherein the aqueous solution is basic.

5. The metal-air battery according to claim 1, wherein the aqueous solution further comprises NaOH as an electrolyte compound.

* * * * *

UNITED STATES PATENT AND TRADEMARK OFFICE
CERTIFICATE OF CORRECTION

PATENT NO. : 10,270,143 B2
APPLICATION NO. : 15/258465
DATED : April 23, 2019
INVENTOR(S) : Hiroshi Suyama et al.

It is certified that error appears in the above-identified patent and that said Letters Patent is hereby corrected as shown below:

In the Specification

In Column 4, Line 43 after "$BH_4^-$,", insert --$F^-$, $Cl^-$,--

Signed and Sealed this
Fourth Day of June, 2019

Andrei Iancu
*Director of the United States Patent and Trademark Office*